United States Patent [19]

Kawakami et al.

[11] Patent Number: 4,971,455
[45] Date of Patent: Nov. 20, 1990

[54] SLIDER

[75] Inventors: Eigo Kawakami, Kawasaki; Kazuya Matsumoto, Yokohama, both of Japan

[73] Assignee: Canon Kabushiki Kaisha, Tokyo, Japan

[21] Appl. No.: 485,823

[22] Filed: Feb. 27, 1990

Related U.S. Application Data

[63] Continuation of Ser. No. 224,256, Jul. 26, 1988, abandoned, which is a continuation of Ser. No. 935,129, Nov. 26, 1986, abandoned, which is a continuation of Ser. No. 663,077, Oct. 17, 1984, abandoned.

[30] Foreign Application Priority Data

Oct. 24, 1983 [JP] Japan .................................. 58-197666

[51] Int. Cl.$^5$ ............................................. F16C 32/00
[52] U.S. Cl. ............................. 384/1; 84/DIG. 24
[58] Field of Search ............... 384/1, 12, 100, 114; 84/DIG. 24

[56] References Cited

U.S. PATENT DOCUMENTS 3,351,393 11/1967 Emmerich .
4,533,186 8/1985 Engwall et al. .
4,545,625 10/1985 Engwall .
4,593,956 6/1986 Caruso et al. ............................ 384/1

OTHER PUBLICATIONS

DE-Z: Technisches Messen atm 1976, No. 11 (1976).

Primary Examiner—Lenard A Footland
Attorney, Agent, or Firm—Fitzpatrick, Cella, Harper and Scinto

[57] ABSTRACT

A slider for guiding a movable article along a guide has an elastic guide member and a movable member which is movable along the guide and is in contact at least on a face with the guide. A standing surface elastic wave is generated on the face of the guide contacting the movable member for supporting the movable member on the peaks of the standing elastic wave.

4 Claims, 3 Drawing Sheets

SLIDER

This application is a continuation of application Ser. No. 07/224,256 filed July 26, 1988, which is a continuation of application Ser. No. 06/935,129 filed Nov. 26, 1986, which is a continuation of application Ser. No. 06/663,077 filed Oct. 17, 1984, all now abandoned.

BACKGROUND OF THE INVENTION

1. Field of the Invention

The present invention relates to a slider used for supporting a movable article, and more particularly to such a slider utilizing surface elastic waves.

2. Description of the Prior Art

A low friction is required for the slider for achieving its objective. For this purpose, the conventional sliders can be classified into the following types with respect to the supporting method of the movable article on a guide:

(A) the contact type, utilizing sliding bearings or rolling bearings such as ball bearings:

(B) a non-contact type utilizing compressed air: and (C) a non-contact type utilizing a magnetic repulsive or attractive force.

The sliders of the (A) type are applied in various fields because of the advantages of low cost, compactness, light weight and low noise. On the other hand, they are associated with the drawbacks of requiring lubrication, and dust-preventive structure leading to cumbersome maintenance.

Also for the purpose of maintaining the movable article at a fixed position, the slider of (A) type has to be subjected to a certain servo operation for positioning, or has to have a certain holding mechanism.

On the other hand, the sliders of the (B) or (C) type have far better durability said serviceability because of the non-contact structure. Also in the case of holding the movable article at a fixed position, the positioning can be achieved by simply terminating the generation of compressed air or magnetic field, since, in the absence of the compressed air or magnetic field, the movable article comes into contact with the guide member and is supported at a determined position by the frictional force thereof. However, the slider of (B) type requires a device for supplying compressed air and is therefore associated with the drawbacks of bulkiness and a high electric power consumption. Besides, the slider of (B) type suffers from a complicated structure because of the presence of pumps and valves for controlling the compressed air pressure.

Also the slider of (C) type requires means for generating the magnetic field, and therefore suffers from bulkiness and a high electric power consumption. Besides, it is associated with the problem of the effect of leaking magnetic field on other devices. The use of a permanent magnet instead of an electromagnet can resolve the problem of power consumption, but gives rise to a new drawback of inability to respond to a change in load.

In this manner, the conventional sliders represented by the types (A), (B) and (C) have respective advantages and disadvantages and are unable to properly respond to the recent trend for higher precision and more compact structure.

SUMMARY OF THE INVENTION

The object of the present invention is to provide a compact slider of simple structure and low electric power consumption and which is still capable of regulating friction and holding forces.

The foregoing object can be achieved according to the present invention by a slider comprising a guide member composed of an elastic member, a movable member in contact with the guide member on at least a face thereof and movable along the guide member, and means for generating a standing surface elastic wave on a face of the guide member in contact with the movable member. Because of the above-described structure, the slider of the present invention supports the movable member on top of the surface elastic wave, and is thus capable of suitably regulating the friction between the movable member and the guide member and easily responding to the change in the load. Also, the slide of the present invention can be made compact and ensures easy maintenance because of the extremely simple structure.

DETAILED DESCRIPTION OF THE PREFERRED EMBODIMENT

Figure 1:
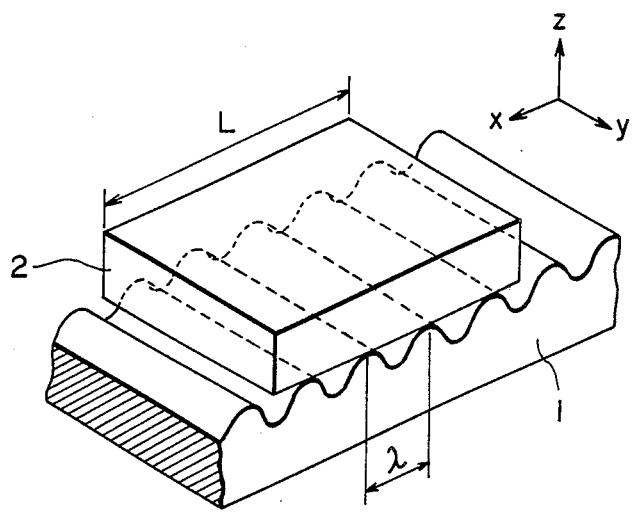
FIG. 1 is a partial perspective view of the slider showing the principle of the present invention.

At first, reference is made to FIG. 1 for explaining the principle of the slider of the present invention. In FIG. 1, an ultrasonic surface elastic wave of a wavelength $\lambda$ is present on the surface of an elastic member 1. A movable member 2 is placed thereon, with a face (bottom face in the illustration) in contact with the elastic wave bearing face of the elastic member 1, and is rendered movable only in the x-axis direction.

When the surface elastic wave of the elastic member 1 reaches the state of a standing wave, the movable member 2 is supported, in line contact, only on the peaks of the surface elastic wave. Consequently the movable member 2 can be displaced with only small external driving force in the x-axis direction.

A change in the load on the movable member 2 can be coped with by the control of the friction between the elastic member 1 and the movable member 2 through a change in the frequency of the surface elastic wave, i.e. the wavelength $\lambda$ thereof. More specifically, the number n of the peaks of the elastic wave supporting the movable member 2 is approximately equal to $L/\lambda$, wherein L is the length of the movable member 2 and $\lambda$ is the wavelength of the surface elastic wave, if L is sufficiently larger than $\lambda$. If the wavelength $\lambda$ becomes smaller, the number n of the peaks or of the contact positions increases, to increase the frictional force. On the other hand if the wavelength $\lambda$ becomes larger (however, still with $\lambda < L/2$), the number n of the peaks decreases, to reduce the frictional force. In this manner a change in the wavelength $\lambda$ of the elastic wave allows the device to respond to the change in the load, thus maintaining a substantially constant friction of the slider.

Also in case of maintaining a fixed position, the servo function after positioning is unnecessary since, by terminating the surface elastic wave, the elastic member 1 contacts with the movable member 2 with the full plane instead of lines, thus obtaining a holding force by the friction between the two. This effect also can be applied in braking the motion of the movable member 2. There are also obtained the additional advantages of no need for oiling, good serviceability and no consideration required for electromagnetic noise caused by the leaking magnetic field associated with the aforementioned sliders of the (C) type.

The basic concept of the present invention explained above will be clarified further in the following embodiments.

Figure 2:
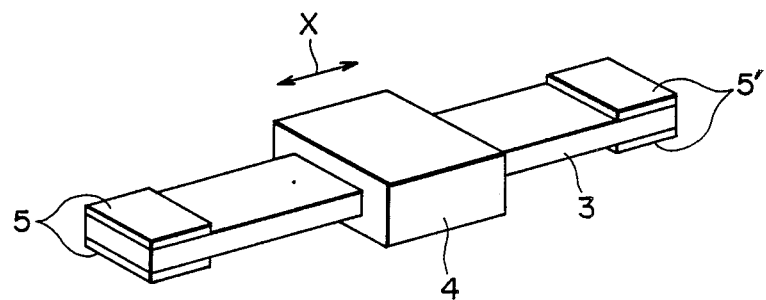
FIG. 2 is a perspective view of a slider representing a first embodiment of the present invention.

FIG. 2 shows a first embodiment of the slider of the present invention, wherein an elastic guide member 3 is provided with a movable member 4 which is movable in a direction X and is in contact, with two faces thereof, with the guide member 3. The guide member 3 is provided on both ends thereof with elastic wave generating means 5, 5' for generating elastic waves on the faces in contact with the movable member 4. The generating means 5, 5' can be composed of known piezoelectric elements, for example utilizing lead zirconate titanate (PZT) or barium titanate.

The generating means 5, 5' generate elastic waves on the faces of the guide member 3, whereby the movable member 4 can be moved in the X-direction with a small force applied by unrepresented means. The guide member 3 can be composed, for example, of brass, aluminum, duralmin, chromium-molybdenum steel, etc. The faces of the movable member 4 contacting with the guide member 3 may be provided with a plastic coating on a metal such as aluminum.

Figure 3:
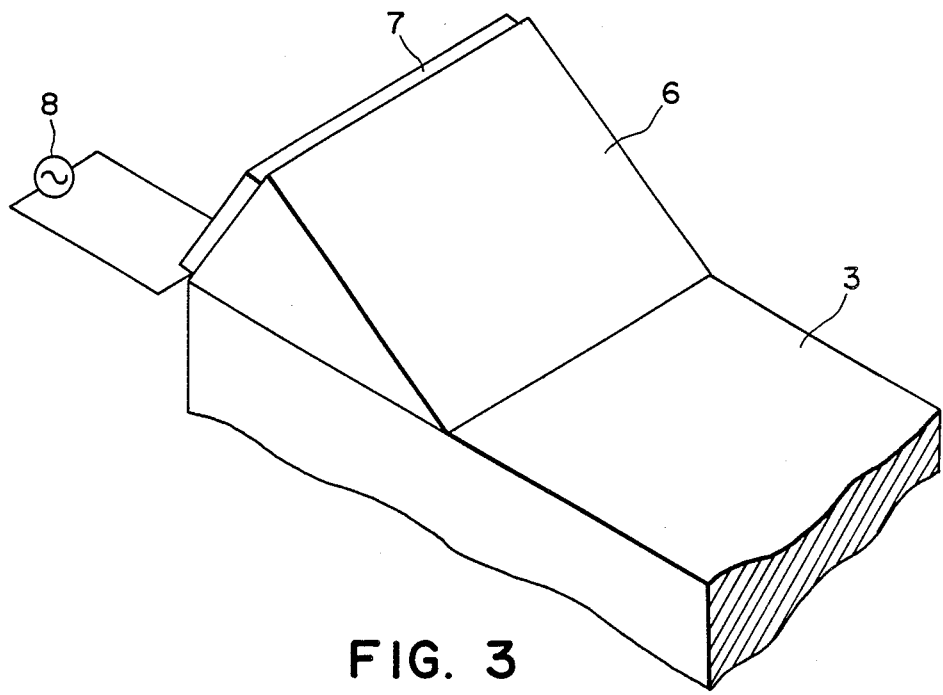
FIG. 3 is a schematic view showing an example of the surface elastic wave generating means.
Figure 4:
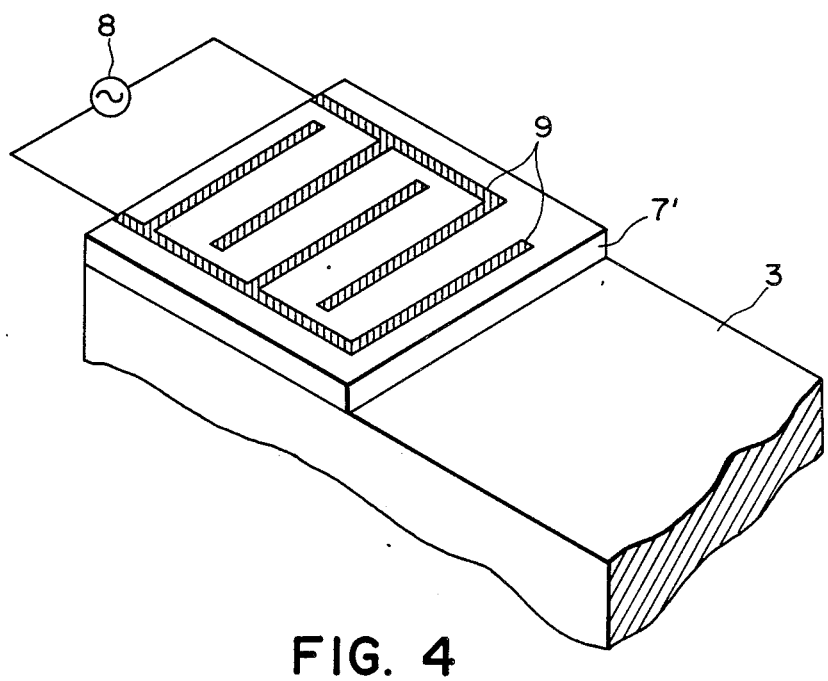
FIG. 4 is a schematic view showing another example of the surface wave generating means.

Now reference is made to FIGS. 3 and 4 for further explaining the structure of the generating means 5, 5'.

In FIG. 3, a wedge 6 is fixed on an end of the elastic guide member 3, and a piezoelectric element 7 is attached on a face of the wedge 6 capable of effectively transmitting vibration to the guide member 3. In response to the supply of an AC voltage from an AC power source 8 to the piezoelectric element 7, said element 7 generates a vibration in a direction of thickness thereof, and the vibration is transmitted through the wedge 6 to the guide member 3 to generate a surface elastic wave on the faces thereof. The wavelength λ of the surface elastic wave is substantially determined by the specific frequency of the piezoelectric element 7. Consequently, for efficient generation of the surface elastic wave, the frequency of the AC power source 8 should be substantially equal to the specific frequency of said element.

FIG. 4 shows another embodiment of the generating means 5, 5'. On an end of the guide member 3 there is directed affixed a piezoelectric element 7', of which comb-shaped electrodes 9 receive an AC voltage from the AC power source 8. In response to the AC voltage supplied to the comb-shaped electrodes 9, the piezoelectric element 7' generates vibration in the direction of thickness thereof, thus generating an elastic wave on the surface of the guide member 3. In this case the wavelength λ of the elastic wave is substantially determined by the pitch of the comb-shaped electrodes 9. Consequently, for efficient generation of the surface elastic wave, the frequency of the AC power source 8 should be substantially equal to the wave propagation speed in the guide member 3 divided by the pitch of the comb-shaped electrodes 9.

Such generating means 5, 5' as shown in FIG. 3 or 4 are fixed on the both ends of the guide member 3 shown in FIG. 2. The presence of two identical elastic wave generating means on both ends of the guide member 3 serve to generate two propagating waves of a same wavelength, thus forming a standing wave on the faces of the guide member 3. For the purpose of forming such standing wave, the length of the guide member 3 between the generating means 5, 5' should be equal to a multiple of a half wavelength of the elastic wave. The standing wave can also be formed by providing the generating means at an end of the guide member only and superposing the wave propagating therefrom with a wave reflected from the other end of the guide member. In such case, the other end of the guide member can be formed either as an open end or a fixed end, but the length of the guide member from the generating means to the other end should again be equal to a multiple of the half wavelength of the elastic wave. Furthermore, the other end of the guide member for reflecting the elastic wave may be provided with a reflector composed of a grating with a frequency selectivity. In such case, for obtaining a strong reflection, the frequency of the grating should be equal to a multiple of the half wavelength of the elastic wave.

The wavelength λ of the surface elastic wave obtained by the aforementioned piezoelectric element is substantially determined by the specific frequency thereof as already explained before, but a change in the frequency in the order of 10% is possible if the frequency of the AC voltage supplied to the piezoelectric element 7 or 7' is changed through the use of an AC power source 8 of variable frequency. For an even larger change in wavelength, plural elastic wave generating means of different specific frequencies may be positioned in parallel on the guide member 3 in the manner as shown in FIG. 3 or 4. As already explained before, the friction of the slider can be regulated by a change in the wavelength of the standing wave.

Figure 5:
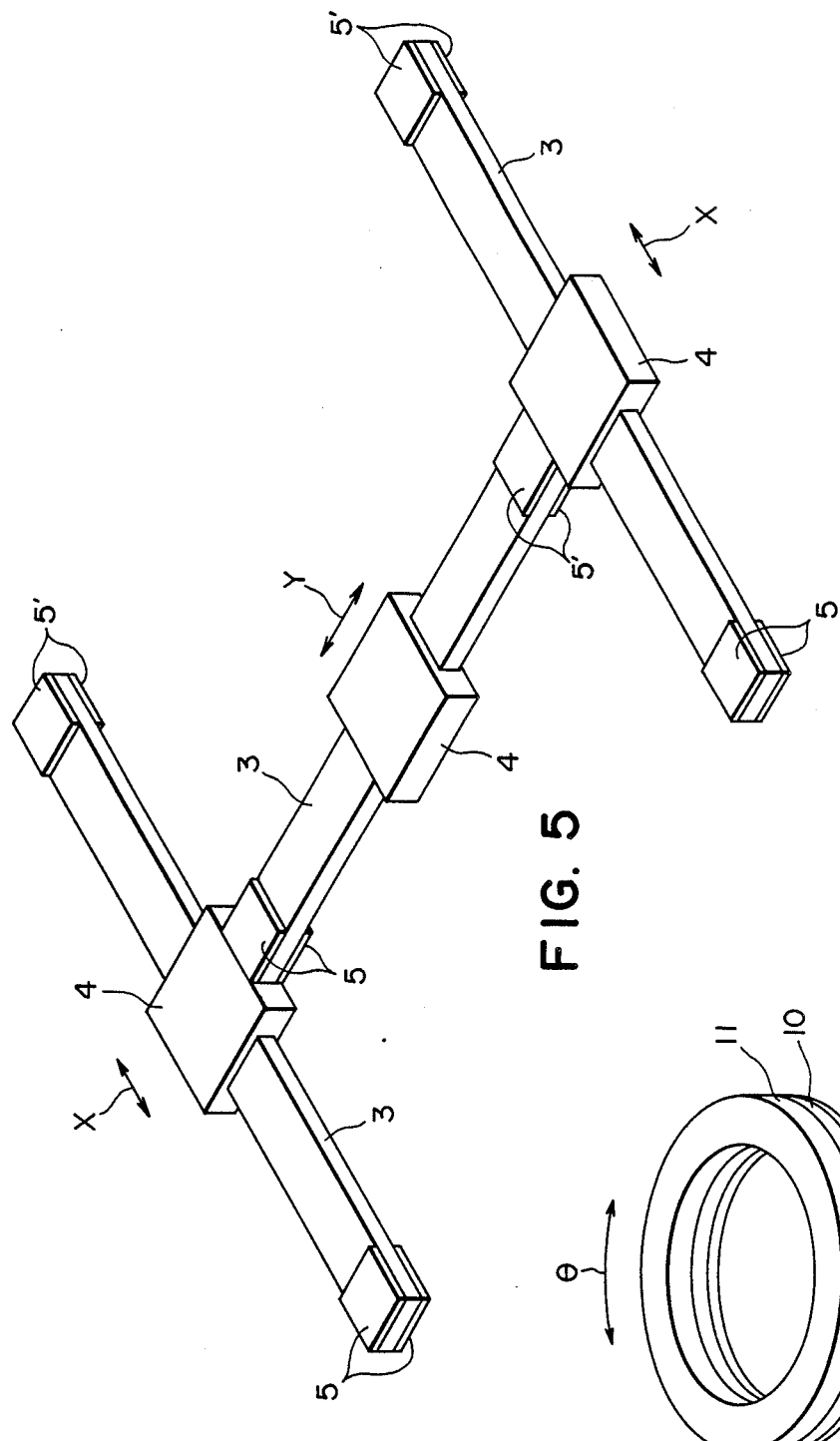
FIG. 5 is a perspective view of a slider representing a second embodiment of the present invention.

FIG. 5 shows a second embodiment of the slider of the present invention, wherein same components as those in FIG. 2 are represented by same numbers. As shown in FIG. 5, an X-Y stage can be obtained by combining plural sliders shown in FIG. 2.

Figure 6:
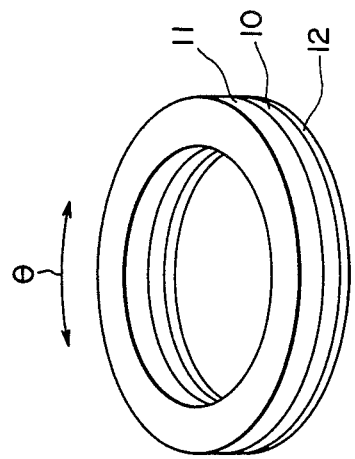
FIG. 6 is a perspective view of a slider representing a third embodiment of the present invention.

Although the foregoing explanation has been limited to the sliders of linear motion, the present invention is likewise applicable to the sliders of rotary motion with the same advantages. FIG. 6 shows a third embodiment of the present invention, wherein a surface elastic wave is generated in the form of a standing form wave on a face of an annular elastic guide member 10 contacting a rotary member 11, whereby the rotary member can be rotated in a direction θ with a small external force. In this case, the generating means 12, if composed of a piezoelectric element 7' as shown in FIG. 4, need not cover the entire circumference of the guide member 10 but may be positioned in plural positions thereof. Consequently, the friction can be suitably regulated if plural generating means 12 (piezoelectric elements 7') of different specific frequencies are provided. However, to obtain a standing elastic wave, the average circumferential length of the elastic guide member 10 should be substantially equal to a multiple of the pitch of the comb-shaped electrodes 9 on the piezoelectric element 7', the pitch substantially corresponding to the half wavelength of the elastic wave to be generated.

In the slider of the present invention, the amplitude of the surface elastic wave is generally less than 1 μm, though it varies with the material constituting the elastic member. The slider of the present invention can be therefore achieve a far higher precision in comparison with the conventional sliders, and is therefore applicable to ultra-high precision instruments such as those for integrated circuit manufacture or inspection.

In addition, the slider of the present invention can be used in vacuum or in a gravity-free state because of absence of lubricant, hydraulic or pneumatic pressure, and can therefore be effectively utilized in various apparatus for use in vacuum or in space.

What is claimed is:

1. A slider comprising:

an elastic guide member having a guide face provided along a predetermined path;

means for generating a standing surface elastic wave on the guide face of said elastic guide member, said means comprising first means for generating a progressing surface elastic wave on said guide member, and second means separated from said first means by a distance equal to a multiple of a half wavelength of said surface elastic wave and adapted to generate a progressing surface elastic wave having a wavelength equal to that of the progressing wave generated by said first means but progressing in a different direction therefrom; and a movable member contacting peaks of said standing surface elastic wave generated on the guide face, said movable member movably supported by said guide member along said path.

2. A slider comprising:

an elastic guide member having a guide face provided along a predetermined path;

means for generating a standing surface elastic wave on the guide face of said elastic guide member, said means comprising a piezoelectric element provided on the guide face of said elastic guide member, comb-shaped electrodes provided on said element and an AC power source connected to said electrodes; and a movable member contacting peaks of said standing surface elastic wave generated on the guide face, said movable member movably supported by said guide member along said path.

3. A slider according to claim 2, wherein the frequency of said AC voltage is substantially equal to the propagation speed of said surface elastic wave in said guide member divided by the pitch of said comb-shaped electrode.

4. A slider according to claim 2, wherein said AC voltage supplying means comprises for varying the frequency of said AC voltage.

* * * * *

UNITED STATES PATENT AND TRADEMARK OFFICE
CERTIFICATE OF CORRECTION

PATENT NO. : 4,971,455
DATED : November 20, 1990
INVENTOR(S) : Eigo Kawakami, et al.

It is certified that error appears in the above-identified patent and that said Letters Patent is hereby corrected as shown below:

COLUMN 6:

Line 27, "comprises for varying" should read --comprises means for varying--.

Signed and Sealed this

Fifth Day of January, 1993

Attest:

DOUGLAS B. COMER

*Attesting Officer*   Acting Commissioner of Patents and Trademarks